United States Patent [19]
Araki

[11] Patent Number: 5,091,873
[45] Date of Patent: Feb. 25, 1992

[54] WORD PROCESSOR WITH A LIQUID CRYSTAL DISPLAY PANEL AND A DETACHABLY ATTACHED LIGHTING UNIT THEREFOR

[75] Inventor: Shigeharu Araki, Nara, Japan
[73] Assignee: Sharp Kabushiki Kaisha, Osaka, Japan
[21] Appl. No.: 453,404
[22] Filed: Dec. 19, 1989

[30] Foreign Application Priority Data
Dec. 20, 1988 [JP] Japan ................................. 63-322408
Dec. 20, 1988 [JP] Japan ................................. 63-322409

[51] Int. Cl.⁵ ............................................. G06F 1/00
[52] U.S. Cl. .................................... 364/708; 361/392; 361/394
[58] Field of Search .............. 364/708, 710.01, 710.02, 364/710.04; 340/711, 700, 784; 350/345; 361/392, 393, 394

[56] References Cited

U.S. PATENT DOCUMENTS
4,561,044 12/1985 Ogura ................................. 362/84
4,635,128 1/1987 Toyoda ............................. 358/236
4,818,980 4/1989 Strasser ........................... 340/784

FOREIGN PATENT DOCUMENTS
0279316 12/1987 Japan.

Primary Examiner—Dale M. Shaw
Assistant Examiner—Andrew Bodendorf
Attorney, Agent, or Firm—Morrison & Foerster

[57] ABSTRACT

A word processor with a main body having a keyboard and a liquid crystal display panel for making a display thereon according to a key operation on the keyboard also includes a lighting unit which is detachably attachable to the main body near the display panel. The lighting unit includes a box-shaped case having an openable lid, a light source disposed inside this case, a mirror attached to the lid so as to reflect light from the light source and to thereby illuminate the display panel when the lid is opened, and terminals which automatically become connected to a power source as the lighting unit is attached to the main body.

6 Claims, 4 Drawing Sheets

WORD PROCESSOR WITH A LIQUID CRYSTAL DISPLAY PANEL AND A DETACHABLY ATTACHED LIGHTING UNIT THEREFOR

BACKGROUND OF THE INVENTION

This invention relates to a lighting unit for a display panel of a word processor and more particularly to a word processor with a liquid crystal display panel and a detachably attached lighting unit for illuminating the display panel.

Prior art word processors of the type having a liquid crystal display panel are generally provided with a back lighting system for the display panel. Since liquid crystal display panels with a back lighting system are more expensive than ordinary types of liquid crystal display panels, however, word processors with a display panel of the former type are also expensive while no advantage is gained by a user who uses such a word processor inside a room or at a place provided with ordinary lighting. As disclosed in Japanese Laid-Open Patent Publication Tokkai 62-279316, on the other hand, there is known a lighting system with a mirror provided near the display panel such that light from a ceiling lamp is directed to the display panel through this mirror but such a lighting system is not usable inside a room without a lamp on the ceiling.

SUMMARY OF THE INVENTION

It is therefore a general object of the present invention to provide a word processor having a liquid crystal display panel and a lighting unit therefor.

It is more particularly an object of the present invention to provide a detachably attachable lighting unit for a liquid crystal display panel of a word processor.

A word processor having a liquid crystal display panel, with which the above and other objects can be achieved, is characterized as including a lighting unit which is detachably attachable to is main body near the liquid crystal display panel. The lighting unit comprises a box-shaped case with an openable lid, a light source disposed inside the case, a mirror which is attached to the inner surface of the lid and serves to reflect light from the light source when the lid is opened to thereby illuminate the display surface of the liquid crystal display panel and power-receiving terminals which becomes electrically connected to a power source such as the power source of the word processor in coordination with the attachment of the lighting unit onto the main body of the word processor. The light source may comprise a plurality of point sources, a linearly elongated source or a light-emitting surface but use is generally made of a fluorescent lamp which is an example of linearly elongated light source and if a fluorescent lamp is used as the light source, it is preferable that an invertor circuit for the lighting of the lamp be contained inside a box-shaped case.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

An embodiment of the present invention is described in detail below with reference to the drawings but the description of this particular embodiment is not intended to limit the scope of the invention.

Figure 1:
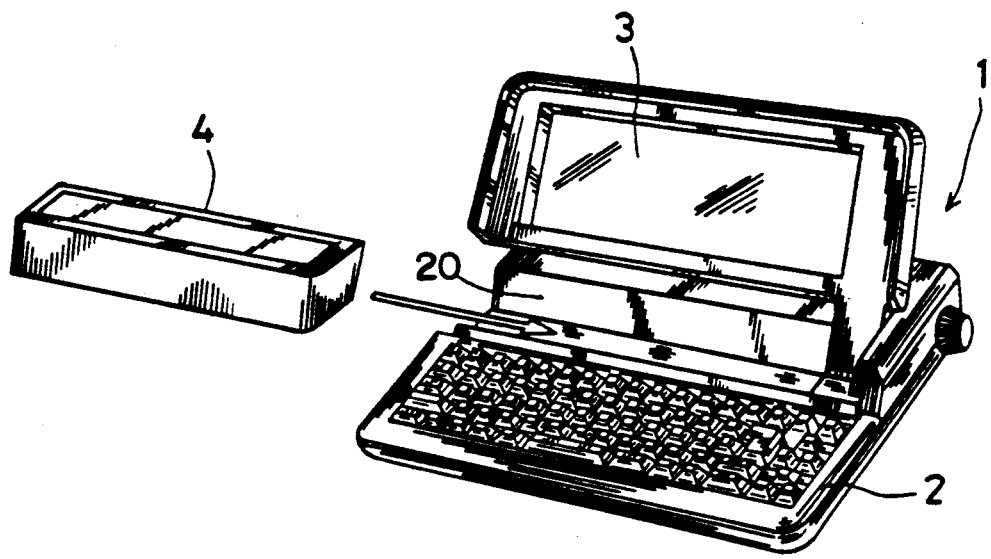
FIG. 1 is a perspective view of a word processor and a lighting unit therefor according to an embodiment of the present invention.
Figure 2:
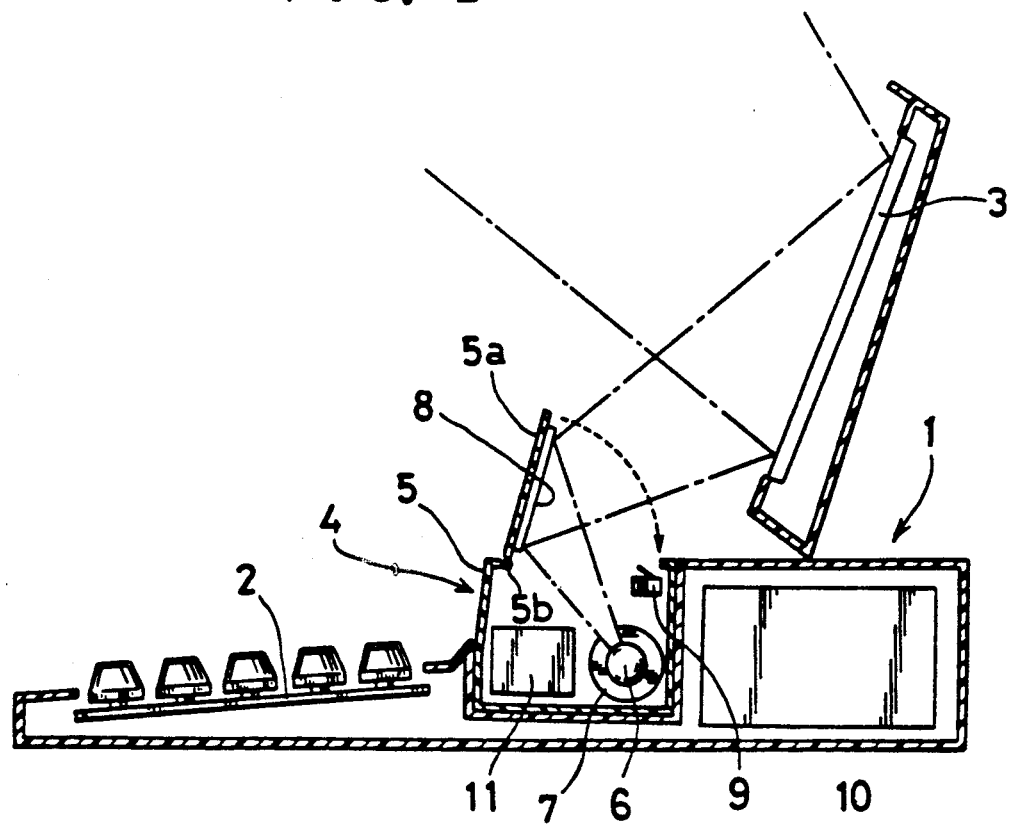
FIG. 2 is a side view of the word processor and the lighting unit of FIG. 1.

With reference first to FIG. 1, numeral 1 indicates a word processor or its main body, numeral 2 indicates its keyboard, numeral 3 is its liquid crystal display panel and numeral 4 indicates a box-shaped lighting unit which can be removably attached to the word processor main body 1 in recessed area 20. With reference next to FIG. 2 which is a cross-sectional view of the word processor main body 1 and the lighting unit 4 attached thereto in recessed area 20 of FIG. 1, numeral 5 indicates a case for the lighting unit 4, having an openable lid 5a provided on the upper surface of the case 5 and a hinge 5b for rotatably attaching the lid 5a to the case 5, numeral 6 indicates a fluorescent lamp serving as an elongated light source disposed inside the case 5, numeral 7 indicates a reflective plate provided behind the light source 6, numeral 8 indicates a mirror which is attached to the inner surface of the lid 5a and serves to reflect light from the light source 6 when the lid 5a is opened to thereby illuminate the liquid crystal display panel 3, numeral 9 indicates a microswitch which is disposed inside the case 5 and is switched on and off in coordination with the opening and closing of the lid 5a, numeral 10 indicates a part containing a power source, control circuits and a printer of the word processor 1, and numeral 11 indicates a lighting circuit for the light source 6.

Figure 3:
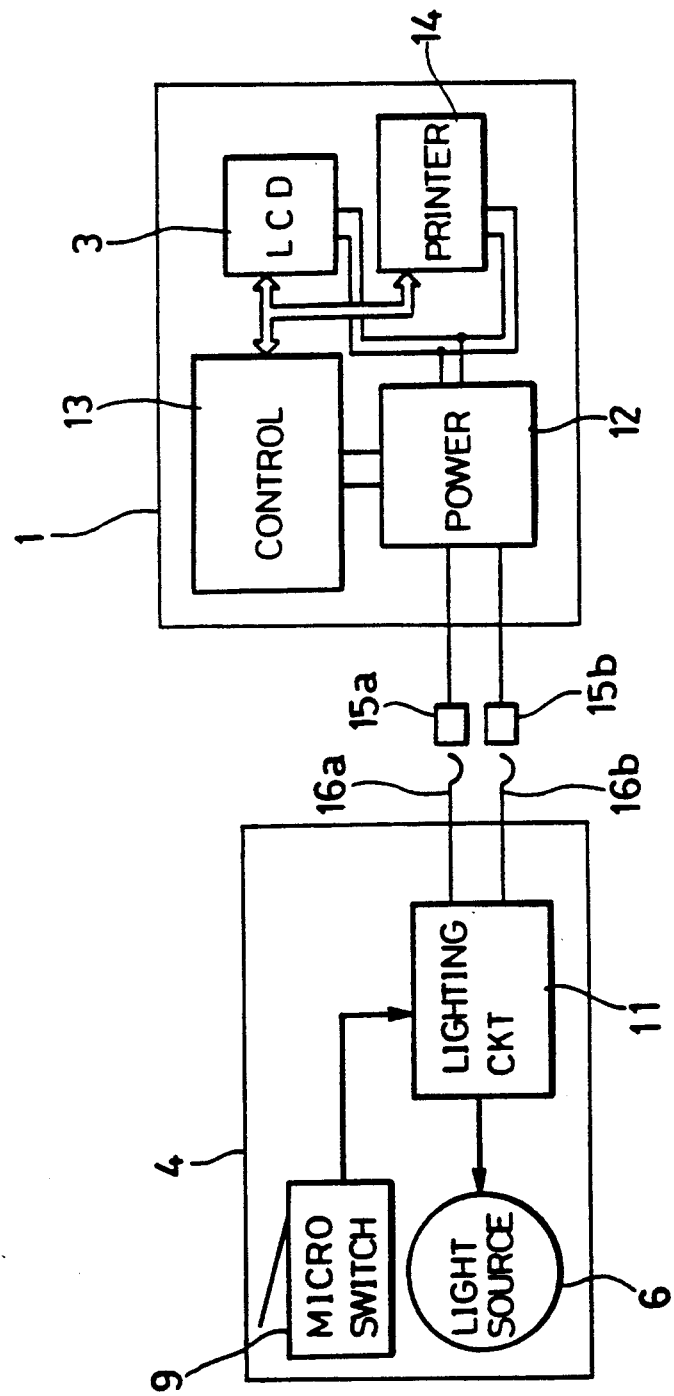
FIG. 3 is a block diagram of a control system for the word processor and the lighting unit of FIGS. 1 and 2.

As shown in FIG. 3, the main body 1 contains a power source 12 for the word processor for supplying power not only to its control circuits 13, printer 14 and the liquid crystal display panel 3 but also to power-supplying terminals shown at 15a and 15b. The lighting unit 4 is provided with power-receiving terminals 16a and 16b which come into contact respectively with the power-supplying terminals 15a and 15b to establish an electrically connected relationship therewith when the lighting unit 4 is attached to the word processor main body 1 such that the voltage outputted from the power source 12 can be supplied to the lighting circuit 11 through these terminals 15a, 15b, 16a and 16b. A light-providing voltage is supplied to the light source 6 by means of the microswitch 9 adapted to be switched on when the lid 5a is opened and the light source 6 is turned off as the lid 5a is closed, thereby switching off the microswitch 9. In other words, the user who finds it desirable to have the display panel 3 illuminated attaches the lighting unit 4 to the word processor main body 1 such that power is automatically supplied to the lighting unit 4 from the main body 1 as the lid 5a is opened and the light source 6 responds by being turned on, the light therefrom being reflected by the mirror 8 to illuminate the liquid crystal display panel 3. When such illumination is not necessary, the user has only to close the lid 5a so as to turn off the light source 6.

Figure 4:
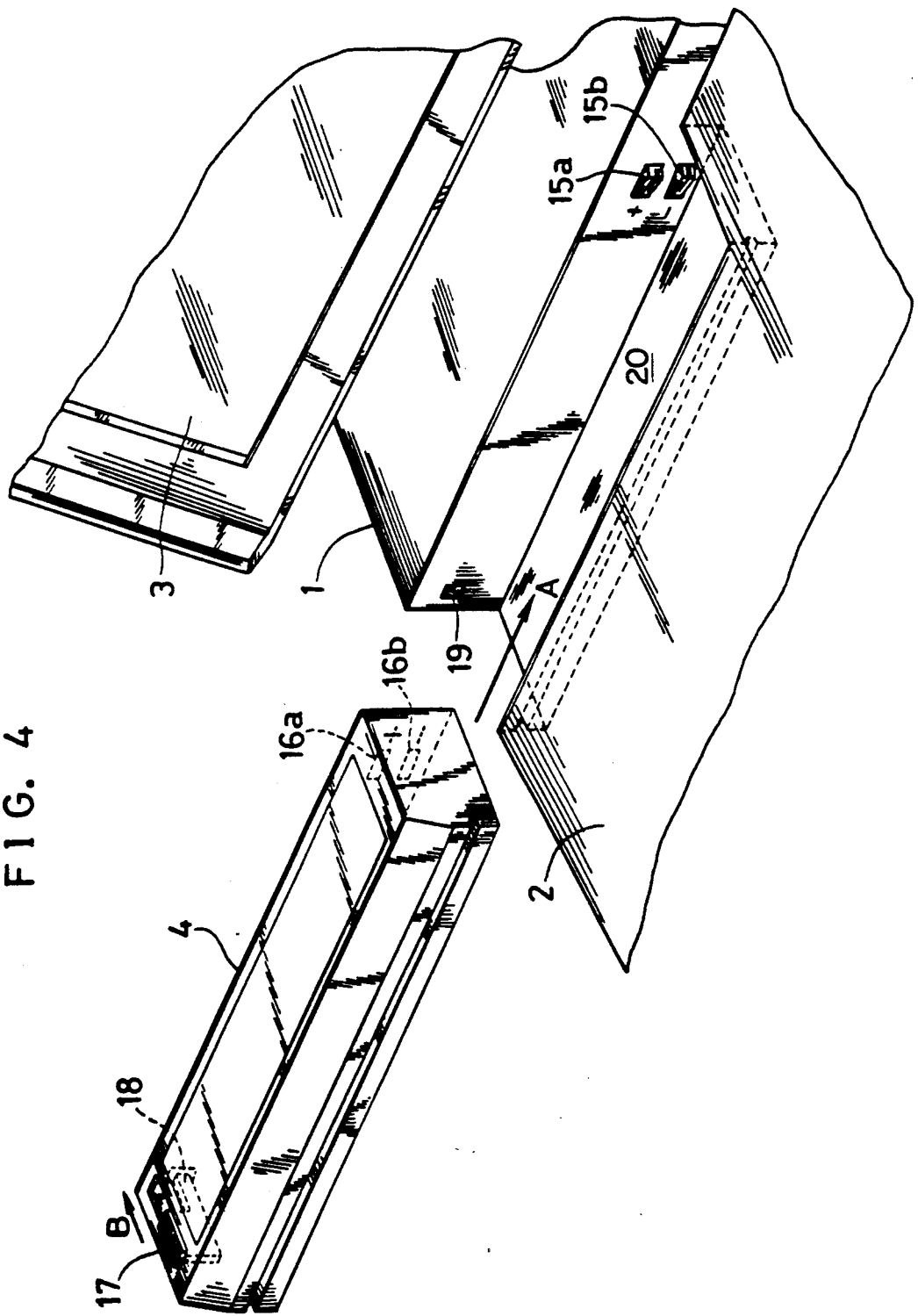
FIG. 4 is an enlarged view of a portion of FIG. 1.

FIG. 4 shows that a locking piece 18 on the lighting unit 4 is inserted into a hole 19 provided in the main body 1 if the lighting unit 4 is inserted into recessed area 20 of main body 1 in the direction of Arrow A and thereafter a slidable knob 17 is slidingly moved in the direction of Arrow B such that the lighting unit 4 becomes fastened to the main body 1. The power-supplying terminals 15a and 15b are made of plate springs such that they are elastically pressed against the power-receiving terminals 16a and 16b.

Figure 5:
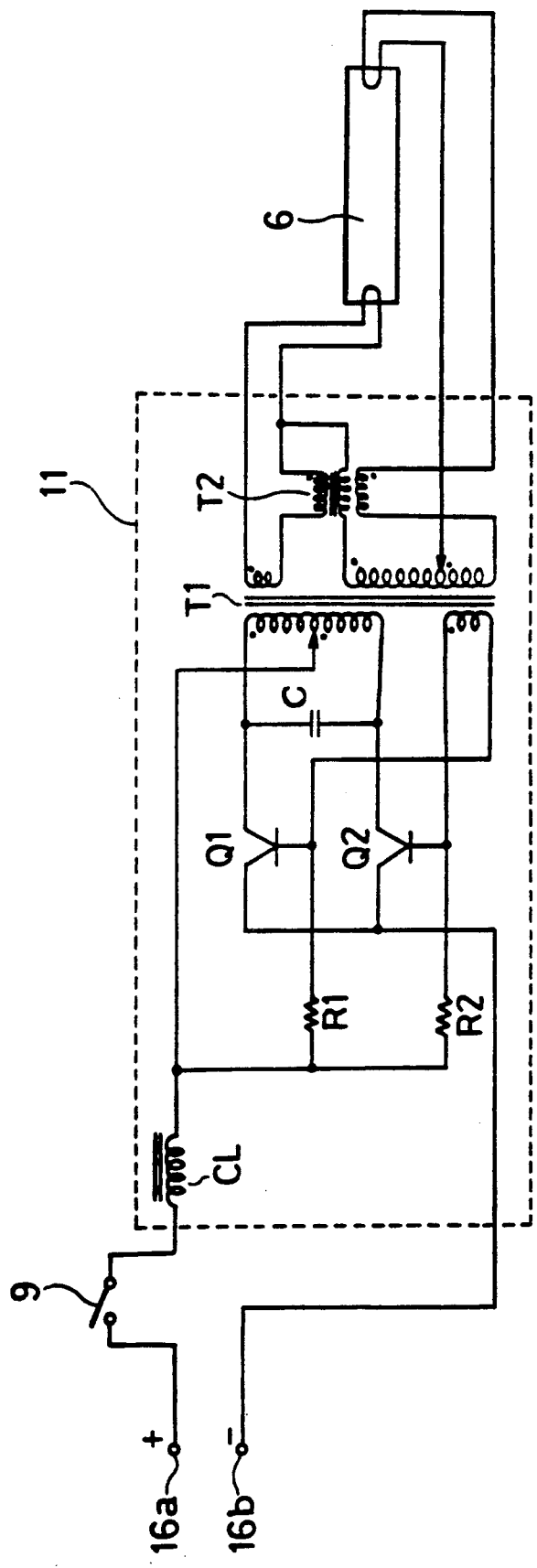
FIG. 5 is a detailed diagram of a portion of FIG. 3.

As shown in FIG. 5, the lighting circuit 11 is an invertor circuit comprising a chalk coil CL, resistors $R_1$ and $R_2$, transistors $Q_1$ and $Q_2$, a capacitor C and transformers $T_1$ and $T_2$. When the microswitch 9 is switched on, the direct current voltage supplied through the power-receiving terminals 16a and 16b is transformed into a high-frequency alternate current voltage by the lighting circuit 11 and applied to the fluorescent lamp 6.

The foregoing description of a preferred embodiment of the invention has been presented for purposes of illustration and description. It is not intended to be exhaustive or to limit the invention to the precise form disclosed, and many modifications and variations are possible in light of the above teaching. For example, power for the light source need not be derived from the word processor but may be supplied from a separate source. Such a separate source may be a cell or a battery. Any such modifications and variations that may be apparent to a person skilled in the art are intended to be included within the scope of this invention.

According to the present invention, the user is free to choose whether or not to attach the lighting unit to the word processor, depending on the lighting condition of the place where the word processor is used. In other words, the lighting unit can be treated as a mere accessory of the word processor such that the user who finds it unnecessary to illuminate the display panel is not required to buy the lighting unit and hence can purchase the word processor at a lower cost.

What is claimed is:

1. A word processor comprising:
   a main body having
     a keyboard,
     a liquid crystal display panel for making a display thereon according to a key operation on said keyboard,
     a power source and power output terminals connected to said power source, and
     a recessed space below said liquid crystal display for receiving a lighting unit for illuminating said liquid crystal display;
   said lighting unit being removably attached in said recessed space to said main body, and including
     an enclosure including a hinged lid having a closed and an opened position,
     a light source disposed inside said enclosure,
     a mirror attached to said lid as to reflect light from said light source to said liquid crystal display panel when said lid is in the opened position, and
     power input terminals connected to said light source contacting said power output terminals of said main body when said lighting unit is attached to said main body thereby providing power to said light source.

2. The word processor of claim 1 wherein said lighting unit further comprises a switch having an OFF position and an ON position interconnected between said power input terminals and said light source, and operated by said hinged lid,
   said switch being held in the OFF position when said hinged lid is in the closed position and held in the ON position when said hinged lid is in the opened position thereby causing power to be supplied to said light source when said lid is opened.

3. The word processor of claim 1 wherein said light source comprises a fluorescent lamp.

4. The word processor of claim 3 wherein said enclosure contains therein an invertor circuit interconnecting said power input terminals and said fluorescent lamp for operating said fluorescent lamp from said power source.

5. The word processor of claim 1 wherein said lid has an inner surface and said mirror is attached to said inner surface.

6. The word processor of claim 1 wherein said power source is inside said main body.

* * * * *